US008677447B1

(12) United States Patent
Zuk et al.

(10) Patent No.: US 8,677,447 B1
(45) Date of Patent: Mar. 18, 2014

(54) IDENTIFYING USER NAMES AND ENFORCING POLICIES

(75) Inventors: Nir Zuk, Menlo Park, CA (US); Song Wang, Palo Alto, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 13/115,508

(22) Filed: May 25, 2011

(51) Int. Cl.
*H04L 29/06* (2006.01)
*G06F 15/16* (2006.01)

(52) U.S. Cl.
USPC .................................. 726/1; 726/26

(58) Field of Classification Search
None
See application file for complete search history.

(56) References Cited

U.S. PATENT DOCUMENTS

| | | | |
|---|---|---|---|
| 6,088,801 A * | 7/2000 | Grecsek | 726/1 |
| 6,751,634 B1 * | 6/2004 | Judd | 1/1 |
| 6,941,465 B1 * | 9/2005 | Palekar et al. | 726/1 |
| 6,944,668 B1 | 9/2005 | Broquist et al. | |
| 7,269,853 B1 * | 9/2007 | Dunn | 726/27 |
| 7,324,999 B2 * | 1/2008 | Judd | 707/690 |
| 7,395,341 B2 * | 7/2008 | Nicodemus et al. | 709/229 |
| 7,475,419 B1 * | 1/2009 | Basu et al. | 726/2 |
| 7,555,550 B2 | 6/2009 | Schunemann | |
| 7,669,226 B2 * | 2/2010 | Bhide et al. | 726/1 |
| 7,818,440 B1 | 10/2010 | Givoly | |
| 7,856,652 B2 * | 12/2010 | Hieda | 726/1 |
| 7,962,513 B1 | 6/2011 | Boles et al. | |
| 8,000,299 B2 | 8/2011 | Lee | |
| 8,260,907 B2 | 9/2012 | O'Sullivan | |
| 8,312,507 B2 | 11/2012 | Chen et al. | |
| 8,423,631 B1 | 4/2013 | Mower et al. | |
| 2003/0126613 A1 | 7/2003 | McGuire | |
| 2005/0132060 A1 | 6/2005 | Mo et al. | |
| 2006/0075092 A1 | 4/2006 | Kidokoro | |
| 2006/0095570 A1 | 5/2006 | O'Sullivan | |
| 2006/0212583 A1 | 9/2006 | Beadle et al. | |
| 2006/0277185 A1 * | 12/2006 | Sato et al. | 707/9 |
| 2007/0004393 A1 * | 1/2007 | Forsberg et al. | 455/420 |
| 2007/0073519 A1 | 3/2007 | Long | |
| 2007/0226775 A1 * | 9/2007 | Andreasen et al. | 726/1 |
| 2008/0060064 A1 | 3/2008 | Wynn et al. | |
| 2008/0109870 A1 | 5/2008 | Sherlock et al. | |
| 2009/0012760 A1 | 1/2009 | Schunemann | |
| 2009/0192970 A1 | 7/2009 | O'Sullivan et al. | |
| 2009/0193498 A1 * | 7/2009 | Agarwal et al. | 726/1 |
| 2009/0327503 A1 * | 12/2009 | Hochmuth et al. | 709/229 |
| 2010/0071042 A1 * | 3/2010 | Hochmuth et al. | 726/7 |
| 2010/0235880 A1 | 9/2010 | Chen et al. | |
| 2010/0287599 A1 * | 11/2010 | He et al. | 726/1 |
| 2010/0325717 A1 * | 12/2010 | Goel et al. | 726/11 |
| 2011/0264531 A1 | 10/2011 | Bhatia et al. | |
| 2012/0017085 A1 | 1/2012 | Carter et al. | |
| 2012/0078903 A1 | 3/2012 | Bergstein et al. | |
| 2012/0271953 A1 * | 10/2012 | Gulley et al. | 709/226 |
| 2013/0124563 A1 * | 5/2013 | CaveLie et al. | 707/770 |

* cited by examiner

*Primary Examiner* — Christopher Revak
(74) *Attorney, Agent, or Firm* — Van Pelt, Yi & James LLP

(57) ABSTRACT

Techniques for identifying user names and enforcing policies are disclosed. An external user account associated with an external application request is identified. A policy is applied based on the identified external user account. One example policy is that access to the external application (via the external user account) should be blocked.

20 Claims, 7 Drawing Sheets

| | Source User | Application | App-User | Action |
|---|---|---|---|---|
| 202 | ALL | SOCIALNETWORKINGSITE116.COM | | DENY |
| 204 | ALL | FTPSITE118.COM | | DENY |
| 206 | Alice.Jones | SOCIALNETWORKINGSITE116.COM | | ALLOW |
| | ALL | SOCIALNETWORKINGSITE116.COM | | DENY |
| | Bob.Smith | FTPSITE118.COM | | ALLOW |
| | ALL | FTPSITE118.COM | | DENY |
| 208 | Marketing | SOCIALNETWORKINGSITE116.COM | | ALLOW |
| | ALL | SOCIALNETWORKINGSITE116.COM | | DENY |
| | Engineering | FTPSITE118.COM | | ALLOW |
| | ALL | FTPSITE118.COM | | DENY |
| 210 | Marketing | SOCIALNETWORKINGSITE116.COM | ACMECorp | ALLOW |
| | ALL | SOCIALNETWORKINGSITE116.COM | ALL | DENY |
| 212 | Director | SOCIALNETWORKINGSITE116.COM | ALL | ALLOW |
| | Marketing | SOCIALNETWORKINGSITE116.COM | ACMECorp | ALLOW |
| | ALL | SOCIALNETWORKINGSITE116.COM | ALL | DENY |

(214) Source User; (216) Application; (218) App-User; (220) Action

IDENTIFYING USER NAMES AND ENFORCING POLICIES

BACKGROUND OF THE INVENTION

Devices such as firewalls are sometimes used to prevent users, such as employees of a company, from accessing external resources. As an example, all access to a specific website or to a class of websites may be prohibited for all users. Unfortunately, there may be a legitimate reason for the user to access such a resource, and thus existing solutions can hamper legitimate activities.

BRIEF DESCRIPTION OF THE DRAWINGS

Various embodiments of the invention are disclosed in the following detailed description and the accompanying drawings.

FIG. 2 illustrates an assortment of policies.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
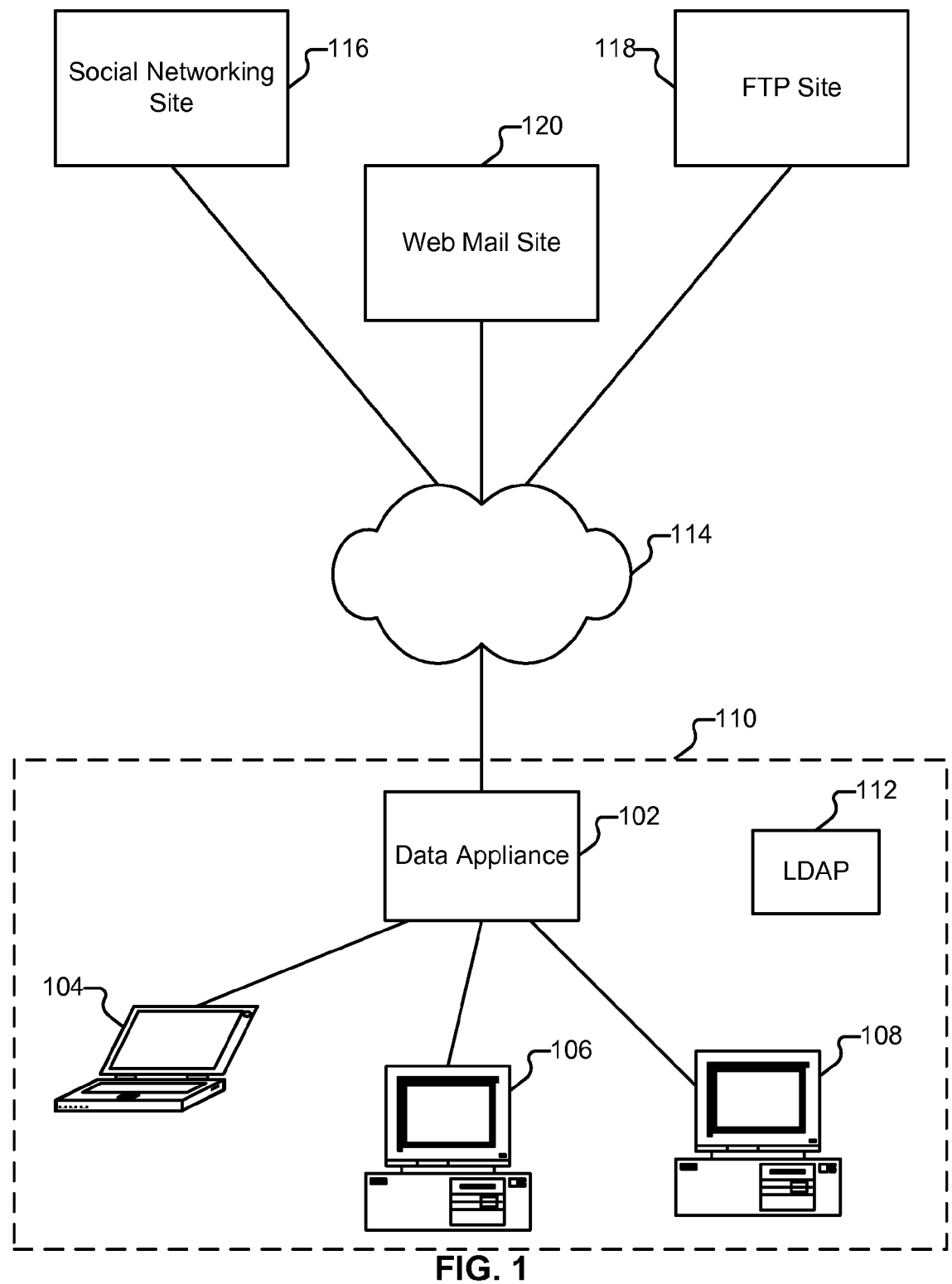
FIG. 1 illustrates an embodiment of an environment in which external user accounts associated with external applications are identified and in which policies that incorporate the identified external user accounts can be enforced.

FIG. 1 illustrates an embodiment of an environment in which external user accounts associated with external applications are identified and in which policies that incorporate the identified external user accounts can be enforced. Examples of external user accounts include both personal and corporate (or otherwise official) accounts with services (also referred to herein as "external applications" and "external sites"), such as social networking websites, web-based email providers, and file repositories. Suppose a company employee (e.g., "Alice Jones," who works at "ACME Corporation") has a corporate username of "Alice.Jones," which is used to access resources on the corporate network, such as email. Alice also has a personal email address (e.g., alice22@example.com) with web mail site 120 and a personal account with social networking site 116. Alice's accounts with site 120 and site 116 are examples of external user accounts. As will be described in more detail below, ACME Corporation has an official account at site 116, which Alice is tasked with helping to maintain. ACME Corporation's account at site 116 is another example of an external user account. Using the techniques described herein, policies that incorporate external user accounts can be enforced, such as by a firewall or other applicable tool.

As illustrated in FIG. 1, a variety of client devices 104-108 are present in an enterprise network 110 which belongs to the ACME Corporation. Device 104 is a laptop computer assigned to Alice (the Director of Marketing); device 106 is a desktop computer assigned to an engineer (referred to herein as "Bob"); and device 108 is a desktop computer assigned to a junior employee in the Marketing Department (referred to herein as "Charlie"). Other types of devices may also be used in conjunction with the techniques described herein, such as cellular phones/personal digital assistants, tablet computers, game consoles, and set-top boxes.

Communications between client devices 104-108 and resources outside of network 110 (e.g., reachable via external network 114) pass through data appliance 102. Such communications may take place using any appropriate communication protocol, such as Hypertext Transfer Protocol (HTTP), Secure Sockets Layer (SSL), and File Transfer Protocol (FTP). In the example shown in FIG. 1, data appliance 102 is a firewall and is configured to enforce policies (also referred to herein as "rules") with respect to the communications it receives. Other types of devices can also be configured to provide the functionality described herein as being performed by data appliance 102. For example, a router, gateway, intrusion detection system, intrusion prevention system, or other appropriate device can be configured to perform either or both of the external user account detection functionality and policy enforcement functionality. As will be described in more detail in conjunction with FIG. 6, device 102 can also be implemented directly on a client device as a host-based solution.

Also included in network 110 is a directory service provider 112, which makes use of the Lightweight Directory Access Protocol (LDAP) or other appropriate protocols. Directory service provider 112 is configured to manage user identity and credential information. Device 102 uses information stored by directory service provider 112 to enforce various policies. Such policies may apply to particular devices, particular users (e.g., "Alice.Jones"), as well as groups (e.g., "laptop devices," "employees in the Marketing Department," and "director-level employees").

FIG. 2 illustrates an assortment of policies. For each of the rules shown in FIG. 2, column 214 indicates users (e.g., object registered in directory service 112) to whom a given rule will apply. Column 216 indicates an application implicated by the rule, and column 220 indicates what action should be taken. As will be described in more detail below, column 218 indicates the identity of an external user account to which the rule applies.

One example of a policy that can be enforced by device 102 is a rule (202) prohibiting all nodes within network 110 (including clients 104-108) from accessing the services of social networking site 116. One reason such a policy might be implemented is to minimize the amount of time wasted by employees on non-work pursuits. Another example of a rule (204) that can be enforced by device 102 is a prohibition on access to file repository sites such as FTP site 118 by nodes within network 110. One reason such a policy might be implemented is to prevent employees from leaking confidential information, such as source code, outside of ACME Corporation.

Both policies will block all users within ACME Corporation from accessing the services of either social networking site 116 or FTP site 118. However, there may be legitimate reasons for at least some employees to access these sites. As one example, if ACME Corporation wishes to maintain an official presence on social networking site 116, it could be appropriate for employees such as Alice to access the social networking site on behalf of ACME Corporation to interact with other users. As another example, ACME Corporation may wish to make available drivers or other software to customers for support purposes. If FTP site 118 is (or includes) a popular repository of drivers, it might be appropriate for employees such as Bob to upload files to FTP site 118 on behalf of ACME Corporation.

One way to allow Alice and Bob access to sites 116 and 118, respectively, would be to include within appliance 102 rules (206) allowing access by those individuals to those sites, but maintaining the prohibition with respect to other users. Group or role based access could also be granted. For example, appliance 102 could be configured with a rule allowing access to site 116 by anyone in the Marketing Department and with another rule allowing access to site 118 by anyone in Engineering (208). One limitation of rules 202-208 is that no restriction is placed on which external account is used to access the services provided by the external application. For example, Alice would be able to access both the official ACME Corporation account (e.g., "ACMECorp") on social networking site 116 and her personal account (e.g., "Mica"). As another example, Bob would be able to upload files on behalf of ACME Corporation (e.g., as "ACMESupport") and as himself (e.g., "BobzWarez").

Using the techniques described herein, data appliance 102 is able to detect which external user accounts are used by employees, such as Alice and Bob, when accessing external applications. Data appliance 102 can also enforce policies based on the identities of those external accounts. As one example, using the techniques described herein, data appliance 102 can enforce rules (210) allowing all members of the Marketing Department (e.g., Alice and Charlie) to access social networking site 116 as the "ACMECorp" user. Rules (212) preventing junior employees from accessing social networking site 116 using personal accounts, while permitting such access by more senior employees could also be implemented. The effect of such polices would be to allow Alice unfettered access to social networking site 116, allow limited access to site 116 to Charlie, and deny access to site 116 to Bob. Additional examples of policies will be described below.

Figure 3:
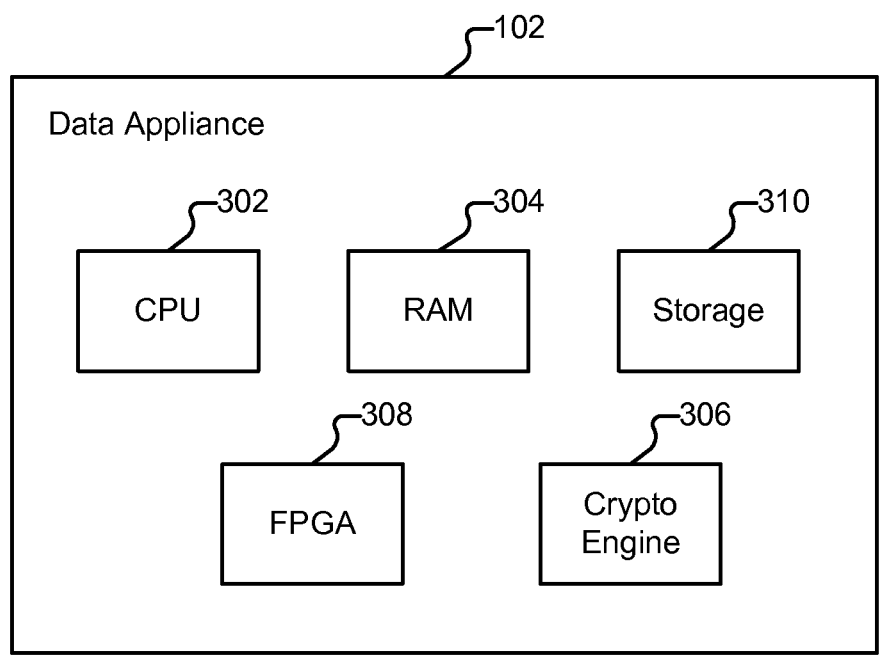
FIG. 3 illustrates an embodiment of a data appliance.

FIG. 3 illustrates an embodiment of a data appliance. The example shown is a representation of physical components that can be included in data appliance 102. Specifically, data appliance 102 includes a high performance multi-core CPU 302 and RAM 304. Data appliance 102 also includes a storage 310 (such as one or more hard disks), which is used to store policy and other configuration information. Data appliance 102 can also include one or more optional hardware accelerators. For example, data appliance 102 can include a cryptographic engine 306 configured to perform encryption and decryption operations, and one or more FPGAs 308 configured to perform signature matching, act as network processors, and/or perform other tasks.

Figure 4:
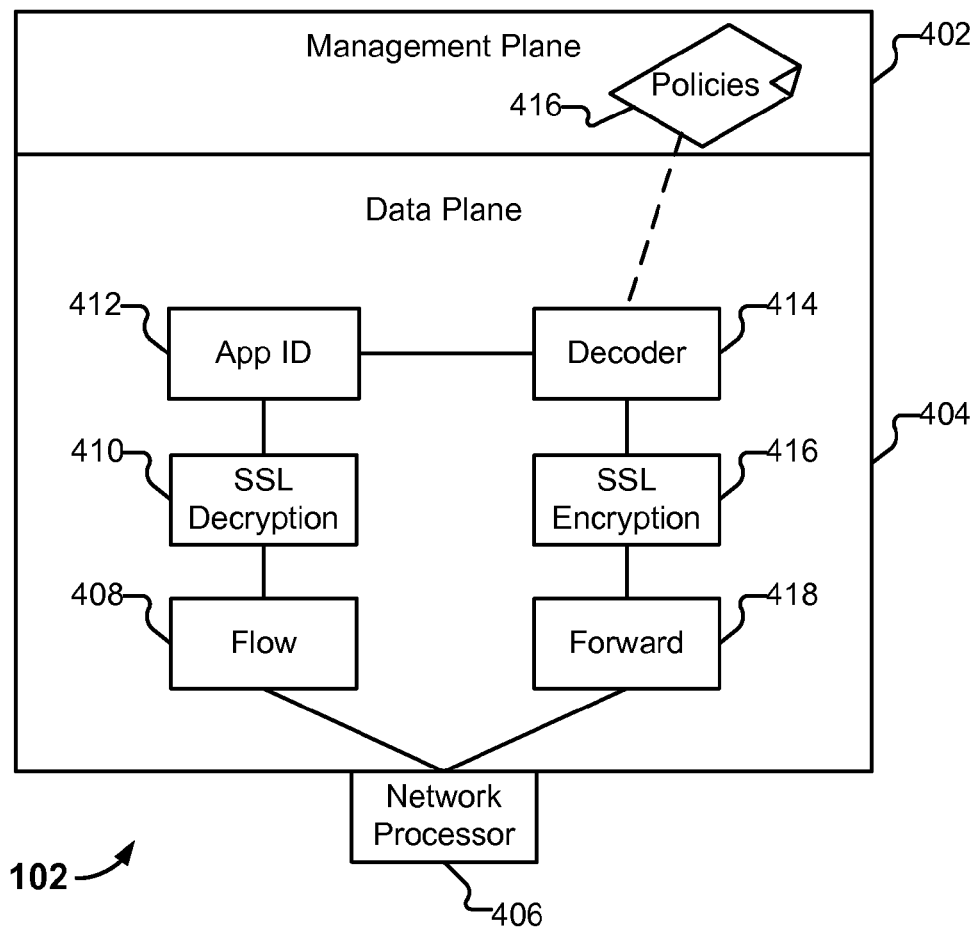
FIG. 4 illustrates an embodiment of a data appliance.

FIG. 4 illustrates an embodiment of a data appliance. The example shown is a representation of logical components that can be included in data appliance 102. Specifically, data appliance 102 includes a management plane 402 and a data plane 404. The management plane is responsible for managing user interactions, such as by providing a user interface for configuring policies and viewing log data. The data plane is responsible for managing data, such as by performing packet processing and session handling. Additional detail pertaining to components of data appliance 102 will now be described in conjunction with an attempted access by Alice (via client device 104) of social networking site 116 using a personal user account.

Suppose Alice launches a web browser on client 104 and attempts to access social networking site 116 (e.g., by typing https://www.socialnetworkingsite116.com into her browser). Social networking site 116 supports the use of SSL. Network processor 406 is configured to receive packets from client device 104, and provide them to data plane 404 for processing. Flow module 408 identifies the packets as being part of a new session and creates a new session flow. Subsequent packets will be identified as belonging to the session based on a flow lookup. If applicable, SSL decryption is applied by SSL decrypter 410. Otherwise, processing by SSL decrypter 410 is omitted. Application identification module 412 is configured to determine what type of traffic the session involves. As one example, application identification module 412 would recognize a GET request in the received data and conclude that the session requires an HTTP decoder. For each type of protocol, there exists a corresponding decoder 414. Based on the determination made by application identification module 412, the packets are sent to an appropriate decoder 414. Decoder 414 is configured to assemble packets (which may be received out of order) into the correct order, perform tokenization, and extract out information. Decoder 414 also performs signature matching to determine what should happen to the packet.

In the case of Alice's attempt to connect to social networking site 116, decoder 414 would parse the assembled data to extract information, such as HOST=socialnetworkingsite116.com. Decoder 414 would determine, via signature matching, that policies exist with respect to logins to the site, and await additional data to determine how to manage the session. After Alice supplies the appropriate credential information to a login screen provided by site 116, decoder 414 would also be able to extract username=AliceJ from the session data. In some embodiments, the extracted external user account is stored, such as in directory service provider 112. In other embodiments, the extracted external user account is maintained (e.g., in RAM 304) only for the session.

Decoder 414 can enforce rules (416) provided by management plane 402, including those applicable, based on the extracted user account information. As one example, based on the set of rules 212 shown in FIG. 2, Alice's attempt to log in to site 116 as user AliceJ would be permitted (because she is a Director). If, as in this example, the packets are allowed to be sent to site 116, as needed, packets are re-encrypted by SSL encryption module 416 and then provided to forward module 418 for transmission to site 116.

Figure 5:
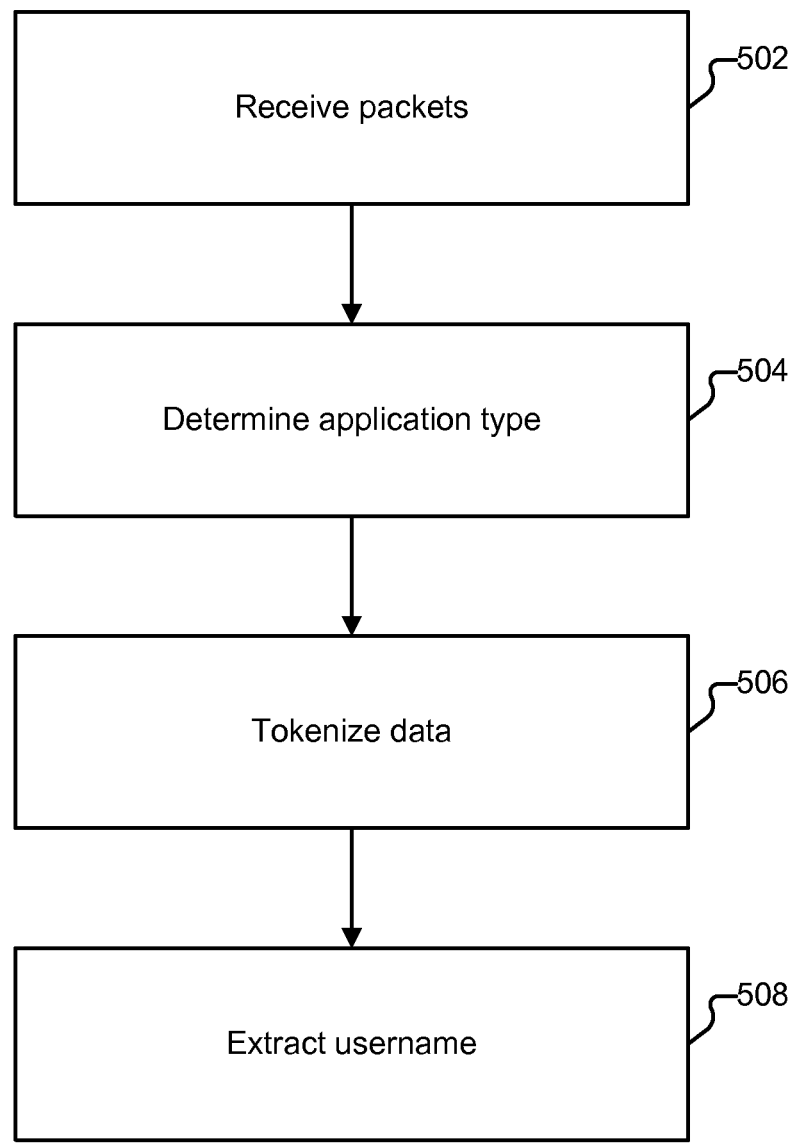
FIG. 5 illustrates an embodiment of a process for identifying an external user account associated with an external application.

FIG. 5 illustrates an embodiment of a process for identifying an external user account associated with an external application. In some embodiments, the process shown in FIG. 5 is performed by data appliance 102. The process begins at 502 when packets are received. As one example, packets are received at 502 by network processor 406, then provided to flow module 408 and SSL decryptor 410, as applicable. At 504, an application type is determined. As one example, at 504, application identification module 412 determines that the data received at 502 is HTTP traffic and provides the packets to decoder 414, which further determines that the packets are an attempt to access social networking site 116. At 506, the received data are tokenized and at 508, data such as a username is extracted. As one example, at 506-508, a decoder assembles the packets it receives into the correct order and extracts username=AliceJ from them.

Figure 6:
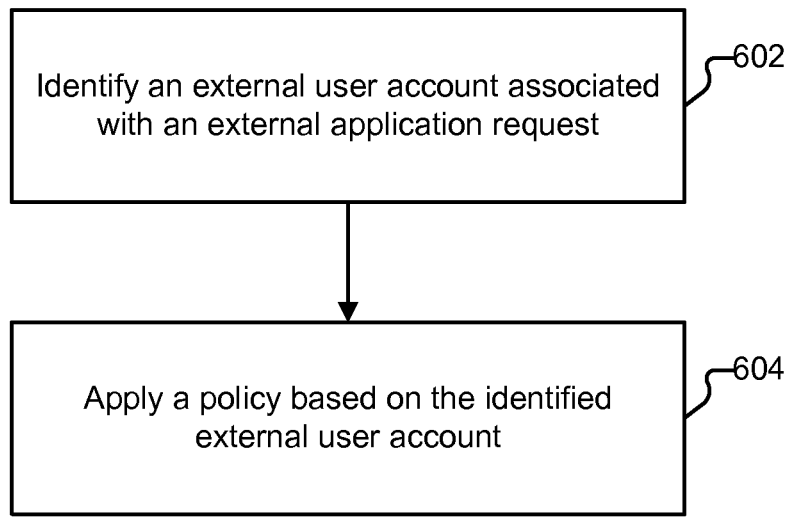
FIG. 6 illustrates an embodiment of a process for identifying an external user account associated with an external application and enforcing a policy.

FIG. 6 illustrates an embodiment of a process for identifying an external user account associated with an external application and enforcing a policy. In some embodiments, the process shown in FIG. 6 is performed by data appliance 102. The process begins at 602 when an external user account associated with an external application request is identified. As one example, at 602, the processing shown in FIG. 5 is performed. At 604, a policy is applied based on the identified external user account. Illustrated in FIG. 2 are two types of actions that can be taken as part of a policy—ALLOW and DENY. Other actions may also be taken. Examples are as follows:

(1) Allow access to the external application as the external user account, and also log information (that would not otherwise have been logged), such as the duration of the session, the amount of bandwidth consumed during the session, and/or the contents of the session. The logged information can be used to enforce other policies. For example, to foster a more enjoyable workplace, ACME Corporation may have a policy allowing employees to access social networking site 116 (using their respective personal accounts) for a limited amount of time per week. Access to the site using the ACMECorp login is not monitored or restricted. If an employee exceeds the weekly quota, another policy may automatically prevent the employee from accessing site 116 using a personal account while still allowing access via ACMECorp. Instead of being blocked from accessing site 116, other actions may also be taken, such as an email warning being mailed to the employee, an email being mailed to the employee's manager, etc. As another example, ACME Corporation may allow employees to access a video streaming site (using personal credentials), subject to a daily bandwidth quota, while allowing unrestricted access to the site (using the corporation's credentials). The amount of time/bandwidth an employee is allotted for personal use of site 116 can also vary based on factors, such as which groups/roles are associated with their corporate identities. For example, a new hire may be given less time per week than a more senior employee.

(2) Allow files to be downloaded from but not uploaded to (or vice versa) the external application, or permit both uploads and downloads, based on the identity of the external user account.

(3) Allow access to chat functionality of site 116 by users accessing the site as ACMECorp and block access to chat functionality (or log the contents of the chat) by users accessing the site using their personal credentials.

(4) Allow read-only access to site 116 by users accessing the site with personal credentials and allow read and write access to site 116 by users accessing the site as ACMECorp.

(5) Apply traffic shaping or other quality of service rules to users accessing site 118 using personal credentials, but provide unrestricted access to users accessing the site as ACME-Support.

(6) Allow access to site 116 by users accessing the site with personal credentials, but only during certain time periods, such as after 17:00 or between the hours of noon and 13:00. Users accessing the site as ACMECorp would not be subject to such time restrictions.

(7) Disallow access to site 116 by users accessing the site with personal credentials, and pop up a dialog warning them that access to site 116 is not allowed. In some embodiments, the dialog instructs the user to access site 116 using a designated official corporate account, if applicable.

Figure 7:
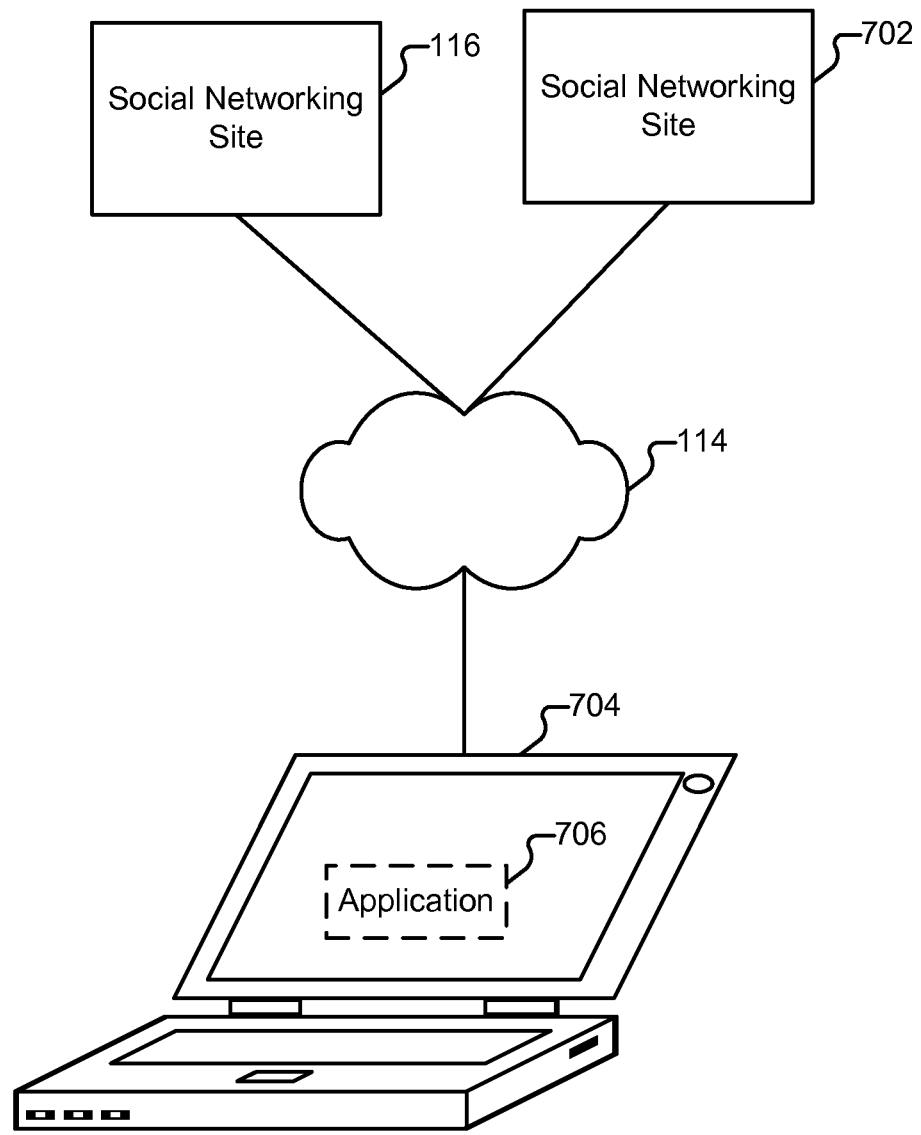
FIG. 7 illustrates an embodiment of an environment in which external user accounts associated with external applications are identified.

FIG. 7 illustrates an embodiment of an environment in which external user accounts associated with external applications are identified. In the example shown, the external user account identification features of data appliance 102 are implemented in a software application 706 installed on computer 704. In various embodiments, software application 706 is a standalone application, is installed as a module of an antivirus program, or is implemented as a browser extension.

In the example shown, computer 704 is personally owned by Alice and is located at Alice's home. Alice has a daughter, Eve. Both Alice and Eve use computer 704 to access social networking site 116. Because Alice is concerned about Eve's online well being, she and Eve have agreed that Eve will share her credentials with Alice so that Alice can log into site 116 as Eve from time to time. Eve has provided Alice with the username "Eve24" and a corresponding password. Eve has a second account with site 116 ("CoolEvie") that she has not told Alice about and also has an account with an alternate social networking site 702.

Using the techniques described herein, application 706 is able to determine a list of each of the distinct usernames that are used to access site 116 and site 702, and provide the list to Alice. Application 706 is also able to enforce various policies based on which username is used to access a given site. As one example, Alice can configure application 706 to allow read and write access by Eve to site 116 when Eve accesses site 116 as "Eve24." Alice may also allow Eve to access site 116 as "CoolEvie," subject to additional constraints, such as by being limited to read-only sessions, particular time constraints, or prohibitions on uploading files.

In the environment shown in FIG. 7, device 704 is a computer. Other devices can also be used in conjunction with application 706, as applicable, such as mobile phones, tablet PCs, and game consoles.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a user request from a client device within a network to access an external application that is outside of the network;
identify an external user account associated with the received external application request;

determine, based at least in part on the identity of the external user account, a policy to apply to the received external application request; and apply the policy to the received external application request;

wherein the policy indicates at least one action to take with respect to the received external application request and wherein the policy is based at least in part on a combination of (1) the identity of the external user account and (2) one of: a local user account associated with a user of the client device, a group associated with the user, an identity of the client device, and a group associated with the client device; and a memory coupled to the processor and configured to provide the processor with instructions.

2. The system of claim 1 wherein the processor is further configured to provide as output an identified external user account name.

3. The system of claim 1 wherein the processor is further configured to associate the identified external user account with the local user account associated with the user of the client device.

4. The system of claim 1 wherein the at least one action indicated by the policy includes blocking access by the client device to the external application.

5. The system of claim 1 wherein the at least one action indicated by the policy includes generating a message that instructs the user of the client device to access the external application using an account that is different from the identified external user account.

6. The system of claim 1 wherein the at least one action indicated by the policy includes performing logging of a session between the client device and the external application.

7. The system of claim 1 wherein the at least one action indicated by the policy includes tracking a duration of a session between the client device and the external application.

8. The system of claim 1 wherein the at least one action indicated by the policy includes tracking an amount of bandwidth consumed during a session between the client device and the external application.

9. The system of claim 1 wherein the at least one action indicated by the policy includes allowing the client device to download a first file while blocking the client device from uploading a second file.

10. The system of claim 1 wherein the at least one action indicated by the policy includes allowing the client device to upload a first file while blocking the client device from downloading a second file.

11. The system of claim 1 wherein the at least one action indicated by the policy includes allowing read-only access to the external application.

12. The system of claim 1 wherein the processor is configured to identify the external user account at least in part by performing a decryption.

13. The system of claim 1 wherein the processor is included in a network appliance.

14. The system of claim 1 wherein the processor is included in a personal computer.

15. A method, comprising:
receiving a user request from a client device within a network to access an external application that is outside of the network;

identifying an external user account associated with the received external application request;

determining, based at least in part on the identity of the external user account, a policy to apply to the received external application request; and applying, using a processor, the policy to the received external application request;

wherein the policy indicates at least one action to take with respect to the received external application request and wherein the policy is based at least in part on a combination of (1) the identity of the external user account and (2) one of: a local user account associated with a user of the client device, a group associated with the user, an identity of the client device, and a group associated with the client device.

16. The method of claim 15 further comprising providing as output an identified external user account name.

17. The method of claim 15 further comprising associating the identified external user account with the local user account associated with the user of the client device.

18. The method of claim 15 wherein the at least one action indicated by the policy includes allowing read-only access by the client device to the external application.

19. The method of claim 15 wherein identifying the external user account includes performing a decryption.

20. A computer program product embodied in a non-transitory computer readable storage medium and comprising computer instructions for:
receiving a user request from a client device within a network to access an external application that is outside of the network;

identifying an external user account associated with the received external application request;

determining, based at least in part on the identity of the external user account, a policy to apply to the received external application request; and applying the policy to the received external application request;

wherein the policy indicates at least one action to take with respect to the received external application request and wherein the policy is based at least in part on a combination of (1) the identity of the external user account and (2) one of: a local user account associated with a user of the client device, a group associated with the user, an identity of the client device, and a group associated with the client device.

* * * * *